United States Patent Office 3,041,384
Patented June 26, 1962

1

3,041,384
PRODUCTION OF HEXACHLORCYCLOHEXANE
Rudolf Koenig, Mannheim, and Robert Aurnhammer, Ludwigshafen (Rhine), Germany, assignors to Badische Anilin- & Soda-Fabrik Aktiengesellschaft, Ludwigshafen (Rhine), Germany
No Drawing. Filed July 15, 1959, Ser. No. 827,155
Claims priority, application Germany July 26, 1958
8 Claims. (Cl. 260—648)

This invention relates to a new and improved process for the production of hexachlorcyclohexane having a high content of the insecticidally active gamma isomer.

It is already known that hexachlorcyclohexane can be prepared by the addition of chlorine to benzene while exposing it to light. In order to obtain a higher content of the valuable gamma isomer, catalytically active substances may be added, for example sodium hypochlorite. The adding-on of the chlorine with exposure to light is unsatisfactory because it is associated with high energy costs and permits only moderate space-time yields.

It is also already known that the alpha- and betaisomers of hexachlorcyclohexane are obtained in modest yields by allowing an aqueous solution of hypochlorous acid to act with exposure to light on benzene (Klingstedt, Act. Acad. Aboensis, Math. et Phys., IV, 2 (1927), pages 1 to 34). In addition to hexachlorcyclohexane isomers, there are obtained benzene substitution products, as for example chlorbenzene, which are exclusively obtained by reaction in the dark.

It has therefore been desirable that a process should be found according to which a hexachlorcyclohexane with a high content of the gamma isomer would be obtained in a good space-time yield without irradiation with light.

We have now found that a hexachlorcyclohexane containing at least 15% of gamma isomer is obtained in a simple way and with good yields by allowing hypochlorous acid to act at temperatures between —20° and +50° C., preferably between 0° and 30° C., for example at between 10° and 25° C., on benzene in the presence of another acid.

The hypochlorous acid is preferably produced in solution by setting it free gradually from a solution or suspension of its salts, such as potassium hypochlorite, sodium hypochlorite, calcium hypochlorite or chloride of lime (which can be regarded as a mixed salt of hypochlorous and hypochloric acids), with the aid of the acid in the presence of which the reaction with benzene is to be carried out, and in the presence of benzene. It is to be recommended that the solutions of hypochlorites used should not be too dilute because otherwise the reaction volume becomes unnecessarily large. For example the 25% bleaching liquors prepared from caustic soda solution and chlorine are well suited for the purpose. Obviously it is also possible to use different salts of hypochlorous acid, for example by commencing the reaction with sodium hypochlorite and continuing it by introducing chloride of lime. The use of solid chloride of lime is advantageous because it permits the reaction of larger amounts in any given reaction vessel.

Suitable acids for setting free the hypochlorous acid from its salts and at the same time promoting the reaction of the same with benzene are inorganic and organic acids with a dissocation constant which is greater than $5 \times 10^{-6}$ and preferably greater than $1 \times 10^{-5}$. Obviously mixtures

2 of acids may also be used, for example sulfuric acid and acetic acid or acetic acid and propionic acid. The preferred acids are strong and medium-strong inorganic acids, such as sulfuric acid, hydrochloric acid or phosphoric acid, and also lower fatty acids, such as formic acid, acetic acid and butyric acid. The concentration of the acid is not of decisive importance. Thus for example 2-normal hydrochloric acid or 10 to 15% sulfuric acid may be used, but more concentrated solutions are recommendable, for example concentrated hydrochloric acid or 40 to 60% sulfuric acid. It is also possible to use 100% acetic acid and even 90% sulfuric acid if the reaction is carried out carefully.

The reaction may be carried out discontinuously by placing commercial benzene and the acid in a stirring vessel and allowing an aqueous solution or suspension of a salt, advantageously an alkali salt, of hypochlorous acid to flow in during the course of a few hours. Good stirring is recommendable, especially if an acid which is not miscible with benzene is being used. The salt of hypochlorous acid is preferably used in such an amount that about 1 mol of hypochlorous acid is formed for each mol of benzene. Since 6 molecules of hypochlorous acid are necessary for the formation of one molecule of hexachlorcyclohexane, the benzene is therefore present in a six-fold excess. Such relative proportions are recommendable because the hexachlorcyclohexane formed then remains dissolved in the excess benzene. It is surprising that in spite of this there is no appreciable formation of products containing smaller amounts of chlorine than hexachlorcyclohexane. The process may however also be carried out when a smaller excess of benzene, for example 3 mols per mol of hypochlorous acid, or a larger amount, for example 10 mols per mol of hypochlorous acid, is used. An amount of acid equivalent to the amount of hypochlorite is preferably present. In some cases it is advantageous to use a slight deficiency of acid, for example 10%, with reference to the hypochlorite. This is especially the case when a strong mineral acid is used. Even in this case the reaction mixture still has an acid reaction toward the end of the reaction, possibly because part of the hypochlorous acid decomposes with the formation of hydrochloric acid before it has reacted with the benzene. It is also possible however to proceed with an excess of acid, especially when an organic acid or an inorganic acid of only moderate strength is used.

The reaction does not require any irradiation with light; it starts immediately, proceeds rapidly and may be kept conveniently within the desired temperature limits, preferably 0° to 30° C., by gentle cooling. It is also possible to carry out the reaction below 0° C. by adding to the benzene an inert solvent which prevents solidification thereof, such as chloroform, methylene chloride, carbon tetrachloride, ethyl chloride, ethylene chlorhydrin or tri- or tetrachlorethylene. The reaction may also be carried out at lowered temperature by providing for a homogeneous and non-solidifying reaction medium by the use of a suitable organic acid or a mixture of organic acids. Thus for example it is possible to work at —15° to —20° C. by using a mixture of acetic acid and propionic acid. Above 30° C., a mixture of water and hypochlorous acid begins to distil and this can be avoided if desired by carrying out the reaction under pressure. In this way reaction temperatures of up to 50° C. are possible. The end of the reaction is evident by a change in color of the reaction mixture from pale brown to pale green and by a jump in temperature of 4° to 6° C. Moreover a continual weak evolution of oxygen is to be observed throughout the course of the reaction.

It is recommendable, especially with large batches, not to add immediately all the acid to the benzene and not to add all the hypochlorite, but to add for example half of the acid at first and half the amount of hypochlorite and to allow the remainder of the acid and the remainder of the hypochlorite to flow in later.

For working up, the remainder of the hypochlorous acid is destroyed, advantageously by addition of a reducing agent, such as sodium bisulfite or hydrogen peroxide, then an amount of a base, preferably about 0.1 to 0.2 equivalent thereof, for example of calcium or sodium hydroxide, per mol of reacted hypochlorous acid, is added and a steam distillation carried out. The unreacted benzene distils off and is used for a fresh batch while the hexachlorcyclohexane remains behind and solidifies. The mixture of isomers thus obtainable in yields of 80 to 90% with reference to hypochlorite and with very good space-time yields, shows a content of 15 to 18% of gamma isomer according to biological and physical methods of testing.

The following examples will further illustrate this invention but the invention is not restricted to these examples. The parts specified are parts by weight.

*Example 1*

500 parts of benzene are mixed with 300 parts of concentrated hydrochloric acid in a vessel fitted with a stirrer and with cooling means and 1200 parts of bleaching liquor (containing 25% of sodium hypochlorite) are added during the course of an hour at 15° to 18° C. to the mixture. Toward the end of the inflow, the temperature rises by 4° to 6° C. It is cooled again to 15° to 18° C. and stirred for another hour. Then again 300 parts of concentrated hydrochloric acid and then again within an hour 1000 parts of bleaching liquor are added. Again the temperature rises slightly toward the end of the addition.

After stirring for 1 to 2 hours, the residual hypochlorous acid still present is destroyed by means of a few parts of sodium bisulfite and the reaction mixture is subjected to a steam distillation. The distillate obtained is 370 parts of unreacted benzene; 300 parts of hexachlorcyclohexane are obtained from the mother liquor.

*Example 2*

A mixture of 600 parts of benzene and 400 parts of 50% sulfuric acid is reacted in the way described in Example 1 with 1300 parts of bleaching liquor within 1 hour. It is stirred for another hour, 200 parts of 98% sulfuric acid are added and then again 1300 parts of bleaching liquor are added within an hour, stirred for 1 to 2 hours and the remainder of the hypochlorous acid destroyed by a little sodium bisulfite. By steam distillation, 360 parts of hexachlorcyclohexane are obtained.

*Example 3*

240 parts of benzene are mixed with 400 parts of 60% acetic acid. 1200 parts of bleaching liquor are added within 1 hour at 10° to 11° C., the whole stirred for another 1 to 2 hours. After working up according to Example 1, 172 parts of hexachlorcyclohexane are obtained.

*Example 4*

500 parts of benzene are mixed with 600 parts of concentrated hydrochloric acid and 2200 parts of bleaching liquor are added within 1 to 2 hours at 15° to 18° C. The whole is stirred for an hour and 370 parts of chloride of lime (containing 39% of active chlorine) are introduced. The whole is stirred for another 1 to 2 hours and worked up as described in the foregoing examples. 400 parts of hexachlorcyclohexane are obtained.

*Example 5*

580 parts of benzene are mixed with 580 parts of glacial acetic acid. During the course of 1 to 2 hours at 10° to 11° C., 1600 parts of bleaching liquor are added, stirred for another hour and 300 parts of chloride of lime are introduced. After stirring for another 1 to 2 hours, it is worked up as above and 294 parts of hexachlorcyclohexane are obtained.

*Example 6*

A mixture of 720 parts of 83% phosphoric acid and 260 parts of benzene are reacted with 2740 parts of a 16% potassium hypochlorite solution during two hours in the way described in Example 1. The whole is stirred for another 2 to 3 hours and the remainder of the unreacted hypochlorous acid destroyed by addition of a small amount of 30% hydrogen peroxide. After steam distillation, 236 parts of hexachlorcyclohexane are obtained.

*Example 7*

200 parts of benzene are mixed with 195 parts of 90% sulfuric acid at about +10° C. and 1200 parts of 25% bleaching liquor are added at this temperature during the course of 3 hours. The whole is stirred for another 1 to 2 hours and, after working up as described in Example 1, 170 parts of hexachlorcyclohexane are obtained.

*Example 8*

720 parts of 25% bleaching liquor are added within an hour at 15° to 18° C. to a mixture of 300 parts of benzene and 750 parts of 15% sulfuric acid. There are then added first another 625 parts of 15% sulfuric acid and then during another hour 640 parts of bleaching liquor, then again 625 parts of 15% sulfuric acid and finally again 640 parts of bleaching liquor, again during the course of an hour. The whole is stirred for an hour and worked up as described above. 285 parts of hexachlorcyclohexane are obtained.

*Example 9*

2600 parts of 25% bleaching liquor are added at −15° C. to a mixture of 300 parts of benzene, 800 parts of glacial acetic acid and 120 parts of propionic acid during the course of 4 to 5 hours. After stirring for another 1 to 2 hours, it is worked up as in Example 1. 350 parts of hexachlorcyclohexane are obtained.

We claim:

1. A process for the production of hexachlorcyclohexane which comprises reacting hypochlorous acid with benzene at a temperature between −20° and +50° C. in the presence of an acid with a dissociation constant which is greater than $5 \times 10^{-6}$.

2. A process for the production of hexachlorcyclohexane which comprises reacting hypochlorous acid with benzene at a temperature between −20° and +50° C. in the presence of an acid selected from the group consisting of hydrochloric acid, sulfuric acid, phosphoric acid, acetic acid and propionic acid.

3. A process for the production of hexachlorcyclohexane which comprises reacting hypochlorous acid with benzene at a temperature between 0° and 30° C. in the presence of an acid selected from the group consisting of hydrochloric acid, sulfuric acid, phosphoric acid, acetic acid and propionic acid.

4. A process for the production of hexachlorcyclohexane which comprises adding a solution of an alkali salt of hypochlorous acid to a mixture consisting essentially of benzene and an acid with a dissociation constant which is greater than $5 \times 10^{-6}$, and reacting the hypochlorous acid thereby formed in said mixture with said benzene at temperatures between 0° and 30° C.

5. A process for the production of hexachlorcyclohexane which comprises adding a solution of an alkali salt of hypochlorous acid to a mixture consisting essentially of benzene and an acid selected from the group consisting of hydrochloric acid, sulfuric acid, phosphoric acid, acetic acid and propionic acid, and reacting the hypochlorous acid thereby formed in said mixture with said benzene at a temperature between 0° and 30° C.

6. A process as claimed in claim 5 wherein part of the alkali salt of hypochlorous acid is replaced by chloride of lime.

7. A process for the production of hexachlorcyclohexane which comprises preparing a reaction mixture consisting essentially of hypochlorous acid, benzene and another acid with a dissociation constant which is greater than $1 \times 10^{-5}$, and reacting said hypochlorous acid with said benzene at a temperature between 0° C. and 30° C.

8. A process as claimed in claim 7 wherein said hypochlorous acid is formed in said reaction mixture by addition thereto of an alkali salt of hypochlorous acid.

References Cited in the file of this patent

FOREIGN PATENTS 685,294   Great Britain _____ Dec. 31, 1952

OTHER REFERENCES

Mellor: "Modern Inorganic Chemistry," Longmans, Green and Co. (1925), page 335.

Kingstedt et al.: Chem. Abs. 23, 1399 (1929).